United States Patent
Chandramouleeswaran et al.

(10) Patent No.: US 7,392,374 B2
(45) Date of Patent: Jun. 24, 2008

(54) MOVING KERNEL CONFIGURATIONS

(75) Inventors: Aswin Chandramouleeswaran, Santa Clara, CA (US); Lisa M. Nishiyama, Sunnyvale, CA (US); Steven T. Roth, Sunnyvale, CA (US); C. P. Vijay Kumar, Sunnyvale, CA (US); Naomi A. Munekawa, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 10/946,200

(22) Filed: Sep. 21, 2004

(65) Prior Publication Data

US 2006/0075299 A1 Apr. 6, 2006

(51) Int. Cl.
*G06F 1/24* (2006.01)
(52) U.S. Cl. .............................. 713/100; 713/1
(58) Field of Classification Search ....... 713/1, 713/2
See application file for complete search history.

(56) References Cited

U.S. PATENT DOCUMENTS

| | | | | |
|---|---|---|---|---|
| 6,101,601 | A * | 8/2000 | Matthews et al. | 713/2 |
| 6,292,890 | B1 * | 9/2001 | Crisan | 713/2 |
| 6,421,777 | B1 * | 7/2002 | Pierre-Louis et al. | 713/2 |
| 6,446,203 | B1 * | 9/2002 | Aguilar et al. | 713/2 |
| 6,826,710 | B2 * | 11/2004 | Merkin et al. | 714/6 |
| 7,167,974 | B2 * | 1/2007 | Roth et al. | 713/1 |
| 7,260,712 | B2 * | 8/2007 | Chandramouleeswaran et al. | 713/1 |
| 7,269,721 | B2 * | 9/2007 | McCardle | 713/1 |
| 2002/0023211 | A1 * | 2/2002 | Roth et al. | 713/164 |
| 2004/0194022 | A1 * | 9/2004 | Cleraux et al. | 715/513 |

OTHER PUBLICATIONS

Hewlett-Packard Development Company, L.P., Managing Kernel Configurations in HP-UK 11i Version 2, pp. 1-38 (May 2003).*

* cited by examiner

*Primary Examiner*—Chun Cao

(57) ABSTRACT

Systems, methods, and devices are provided for kernel configurations. One embodiment includes a kernel configuration tool, a system file accessible by the kernel configuration tool, and means for automatically detecting and moving a kernel configuration in association with boot and shutdown routines.

43 Claims, 5 Drawing Sheets

MOVING KERNEL CONFIGURATIONS

BACKGROUND

In a computing device, such as a server, router, desktop computer, laptop, etc., and other devices having processor logic and memory, the device includes an operating system and a number of application programs that execute on the computing device. The operating system layer includes a "kernel". The kernel is a master control program that runs the computing device. The kernel provides functions such as task, device, and data management, among others. The application layer includes application programs that perform particular tasks. These programs can typically be added by a user or administrator as options to a computer device. Application programs are executable instructions, which are located above the operating system layer and accessible by a user.

The application layer and other user accessible layers are often referred to as being in "user space", while the operating system layer can be referred to as "kernel space". As used herein, "user space" implies a layer of code which is more easily accessible to a user or administrator than the layer of code which is in the operating system layer or "kernel space".

In an operating system parlance, the kernel is the set of modules forming the core of the operating system. The kernel is loaded into main memory first on startup of a computer and remains in main memory providing services such as memory management, process and task management, and disk management. The kernel also handles such issues as startup and initialization of the computer system. Logically, a kernel configuration is a collection of all the administrator choices and settings needed to determine the behavior and capabilities of the kernel. This collection includes a set of kernel modules (each with a desired state), a set of kernel tunable parameter value assignments, a primary swap device, a set of dump device specifications, a set of bindings of devices to other device drivers, a name and optional description of the kernel configuration, etc.

System users, e.g., system administrators may make changes to a running kernel configuration that will not take effect until a next system boot and may save kernel configurations to be selected for a later boot. When a system user wants to shutdown a computing device and/or computing system a shutdown routine can be called either via a shutdown command (e.g., an orderly shutdown) or the reboot command (e.g., a quick, abrupt shutdown). Previously, shutdown routines called through a shutdown command would move a selected or marked new kernel configuration into place during shutdown, but shutdown routines called through a reboot command would not. That is, the shutdown routine associated with the reboot command did not handle saved configurations, kernel registry service (KRS) databases, titles, etc. For reboot, the system user had to manually move the new desired kernel configuration into place prior to reboot.

Another issue with various kernel configurations involves crash dumps. When a kernel configuration gets into a bad error state, e.g., panic state, from which it is unable to recover, it is said to have crashed. At this point several utilities try to save the kernel state, e.g., what programs were running and what their state was at the time of the crash, on to disk so that the problem can be investigated further. This saved kernel state information can be referred to as a crash dump. While saving the state data to a known location, the utility tools will also attempt to save a copy of the kernel configuration which caused the crash.

Current crash utility tools are unable to deterministically say which kernel configuration caused the panic. Crash utility tools typically copy a kernel configuration located at a pre-defined directory along with a crash dump. In some scenarios, a system user may have interacted with a boot prompt to boot to a kernel configuration different from the one which is present at the pre-defined directory. Hence, if a crash dump occurs while using another boot prompted kernel configuration, the system user would have to remember to manually copy this requested kernel configuration for diagnostic use since a different kernel configuration exists in the pre-defined directory and would have been copied by default. If the wrong kernel configuration is copied along with the crash dump, the results will be unreadable since a kernel id contained in the crash dump will not match the kernel configuration copied from the pre-determined directory.

DETAILED DESCRIPTION

A program embodiment is provided which executes instructions, at a system shutdown, to check whether a new kernel configuration has been requested at a next boot. The program instructions execute to force a write operation of all kernel configuration information in a kernel registry memory to a disk. The program instructions can execute to disable new kernel registry memory writes to the disk while performing kernel configuration operations on the disk. The program instructions automatically move the new kernel configuration, to be used at the next boot, from the disk to a boot location. The program instructions can execute to copy the new kernel configuration and all files and links in a directory of the new kernel configuration to a /stand/current directory. The program instructions also execute to create a link to the new kernel at the name/stand/vmunix to use upon a system startup.

A program embodiment is provided which executes instructions, at a system startup, to check whether a different kernel configuration is requested at a boot prompt. If a different kernel configuration is requested, the program instructions execute to automatically boot the different kernel configuration and execute to identify the different kernel configuration as the booted kernel configuration. The program instructions execute to check whether there are pending kernel configuration changes since last boot that have not been applied. And, in various embodiments, when there are pending kernel configuration changes, the program instructions execute to force a system shutdown routine and reboot as described above.

A program embodiment is also provided which executes instructions, at a system startup, to check whether an unsaved crash dump from a previous system error exists. The program instructions execute to copy the kernel configuration which caused the system error to a designated file location. The program instructions can execute, in connection with copying the kernel configuration which caused the system error, to copy a kernel configuration from a /stand/current directory to a stand/crashconfig directory. The program instructions can also execute to check whether there are dynamic kernel modules to be loaded and, if so, can execute to load the dynamic kernel modules during boot.

Figure 1:
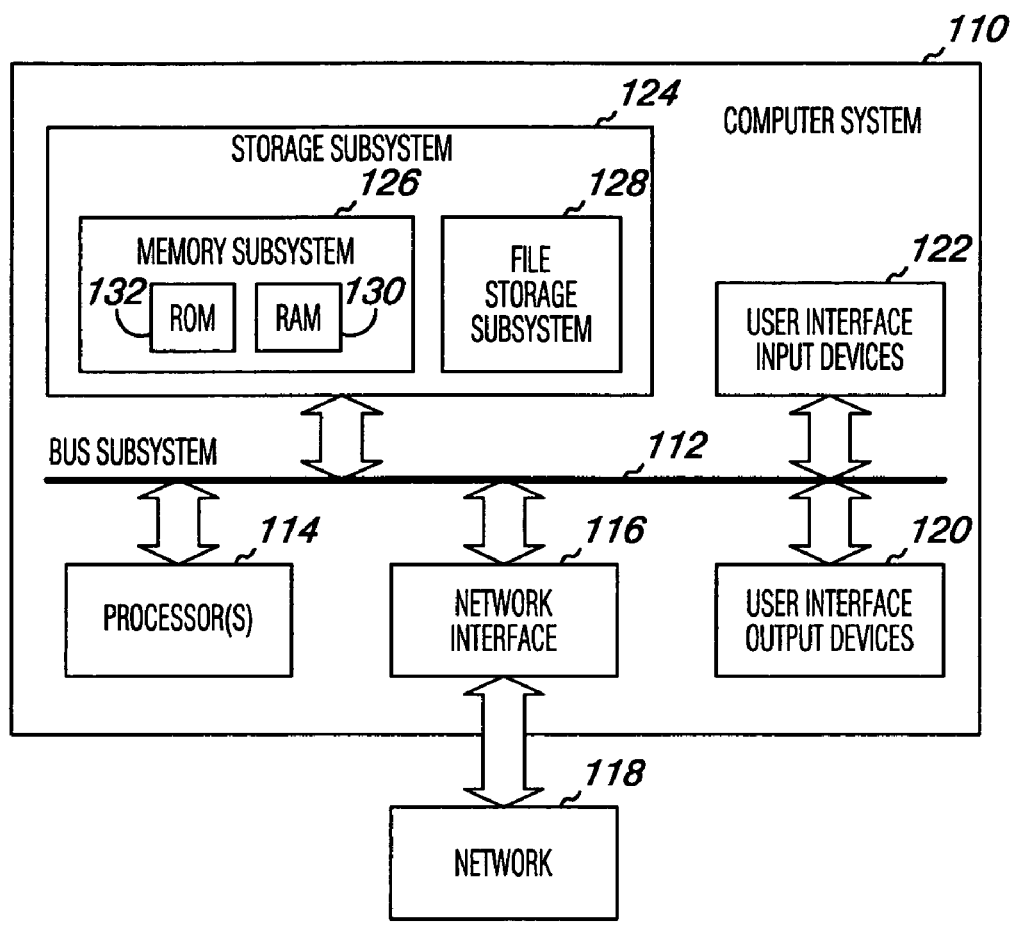
FIG. 1 is a block diagram of a computer system suitable to implement embodiments of the invention.

FIG. 1 is a block diagram of a computer system 110 suitable to implement embodiments of the invention. Computer system 110 includes at least one processor 114 which communicates with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, as the same are known and understood by one of ordinary skill in the art. Communication links as used herein may be hardwire links, optical links, satellite or other wireless communications links, wave propagation links, or any other mechanisms for communication of information.

User interface input devices 122 may include a keyboard, pointing devices such as a mouse, trackball, touchpad, or graphics tablet, a scanner, a touchscreen incorporated into a display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may be a cathode ray tube (CRT), a flat-panel device such as a liquid crystal display (LCD) and/or plasma display, or a projection device (e.g., a digital light processing (DLP) device among others). The display subsystem may also provide non-visual display such as via audio output devices. In general, use of the term "output device" is intended to include all possible types of devices and ways to output information from computer system 110 to a user or to another machine or computer system 110.

Storage subsystem 124 can include the operating system "kernel" layer and an application layer to enable the device to perform various functions, tasks, or roles. Memory subsystem 126 typically includes a number of memories including a main random access memory (RAM) 130 for storage of program instructions and data during program execution and a read only memory (ROM) 132 in which fixed instructions are stored. File storage subsystem 128 can provide persistent (non-volatile) storage for additional program and data files, and may include a hard disk drive, a floppy disk drive along with associated removable media, a compact digital read only memory (CD-ROM) drive, an optical drive, or removable media cartridges. As used herein, a computer readable medium is intended to include the types of memory described above. Program embodiments as will be described further herein can be included with a computer readable medium and may also be provided via modulating a carrier wave over a communications network such as a wireless network, the Internet, etc.

Bus subsystem 112 provides a mechanism for letting the various components and subsystems of computer system 110 communicate with each other as intended. Although bus subsystem 112 is shown schematically as a single bus, alternate embodiments of the bus subsystem 112 may utilize multiple busses.

Program embodiments according to the present invention can be stored in the memory subsystem 126, the file storage subsystem 128, and/or elsewhere in a distributed computing environment as the same will be known and understood by one of ordinary skill in the art. Due to the ever-changing nature of computers and networks, the description of computer system 110 depicted in FIG. 1 is intended only as one example of a computing environment suitable for implementing embodiments of the present invention. Many other configurations of computer system 110 are possible having more or less components than the computer system depicted in FIG. 1.

Computing networks can include multiple computing devices such as servers, desktop PCs, laptops, and workstations, among other peripheral devices, e.g., printers, facsimile devices, and scanners, networked together across a local area network (LAN) and/or wide area network (WAN). A LAN and/or WAN uses clients and servers that have network-enabled operating systems such as Windows, Mac, Linux, and Unix. An example of a client includes a user's workstation. Clients and servers can be connected in a client/server relationship in which the servers hold programs and data that are shared by the clients in the computing network.

As mentioned above, the kernel layer of a computer system manages the set of processes that are running on the system by ensuring that each process is provided with processor and memory resources at the appropriate time. A process refers to a running program, or application, having a state and which may have an input and output. The kernel provides a set of services that allow processes to interact with the kernel and to simplify the work of an application writer. The kernel's set of services is expressed in a set of kernel modules. A module is a self contained set of instructions designed to handle particular tasks within a larger program. Kernel modules can be compiled and subsequently linked together to form a kernel. Other types of modules can be compiled and subsequently linked together to form other types of programs. As used herein an operating system of a computer system can include a Unix, Linux, AIX, Windows, and/or Mac operating system, etc.

Figure 2A:
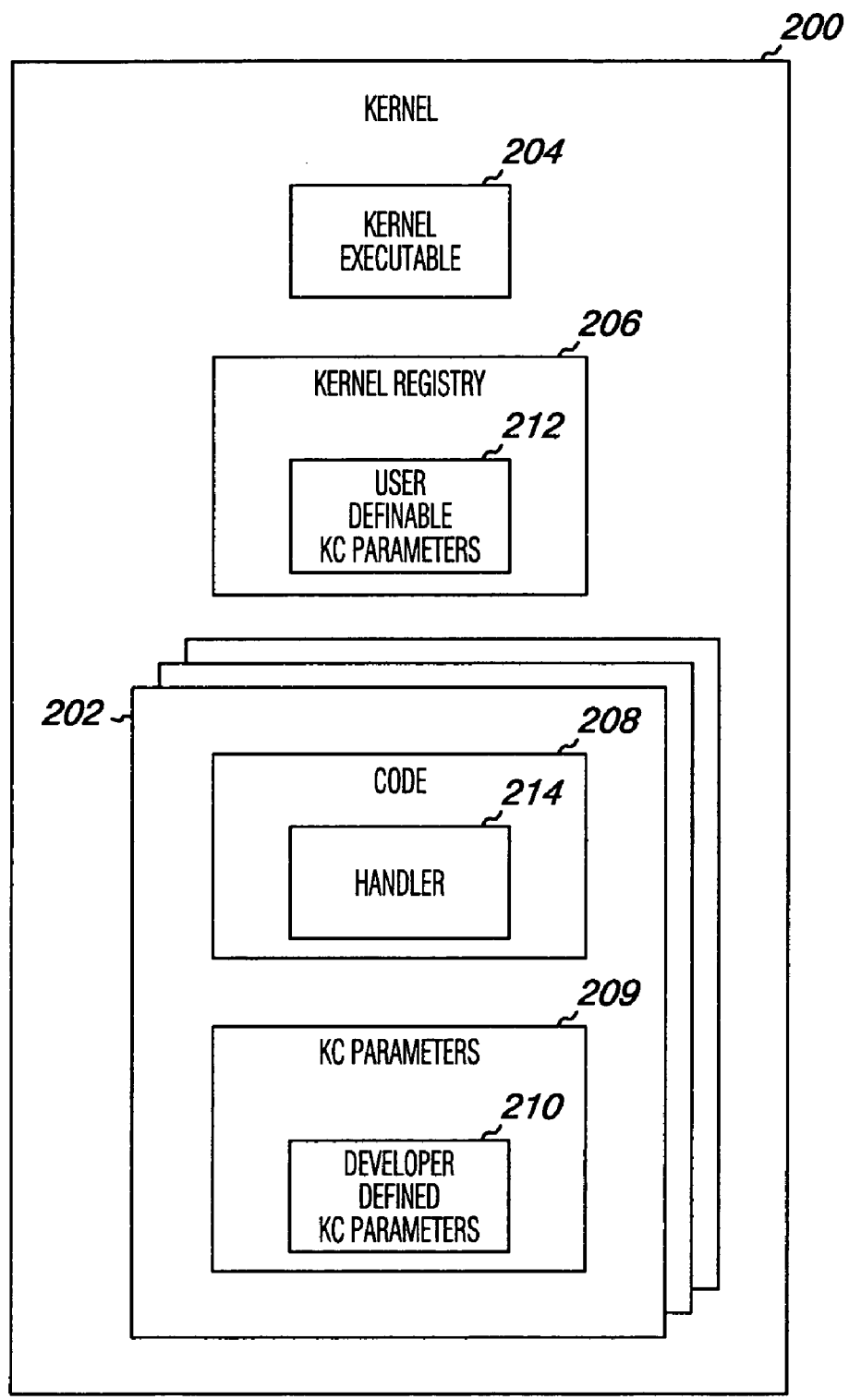
FIG. 2A illustrates a kernel configuration having a number of modules.

FIG. 2A illustrates a kernel configuration 200 having a number of modules 202. As one of ordinary skill in the art will appreciate, once a set of modules are created in a development environment for a kernel configuration 200 they are shipped from a supplier to a user or customer. Developer provided, kernel configuration (KC) parameters 209 can be made available to a system user, e.g., system administrator. Some kernel configuration parameters 209 (also referred to herein as logical settings) are set by the kernel developer (illustrated as 210), and cannot easily be changed subsequent to installation of the operating system kernel. Others (illustrated as 212) may be changed by a system user, e.g., system administrator, to provide a new logical setting based on user feedback received in response to a customer user interface feedback session. As mentioned above, logically a kernel configuration is a collection of all the administrator choices and settings needed to determine the behavior and capabilities of the kernel. This collection includes a set of kernel modules (each with a desired state), a set of kernel tunable parameter value assignments, a primary swap device, a set of dump device specifications, a set of bindings of devices to other device drivers, a name and optional description of the kernel configuration, etc.

Physically, a kernel configuration 200 is a directory that contains the files needed to realize a desired behavior for the operating system. The directory includes: a kernel executable 204, a set of kernel modules files 202, and a kernel registry database 206 (containing the logical settings described above). As illustrated in FIG. 2A each kernel module 202 includes kernel code 208 and kernel (KC) parameters, or logical settings, 209 (some developer defined 210 and some user definable 212 as illustrated in the kernel registry database 206). The kernel code 208 includes a kernel configuration handler function 214 which controls the kernel configuration parameters 209. Kernel tunables are one example of kernel configuration parameters 209 which control some behavior of the operating system kernel. The tunable parameters are integer values used to define how the kernel is to behave. For example, tunable values can include a setting for the number of processes for each user on a system, a setting for a total number of processes on the system, security features, etc. The tunable values are initialized by a tunable initialization function, which is part of the kernel code. Kernel tunable parameters are usually managed manually. Some tunable value changes, e.g. by a system administrator, can be implemented immediately to a running system, others cannot and some can only be implemented through rebuilding the kernel. For example, it is not possible to immediately reduce the value of some resource below a current usage. When a kernel configuration parameter change, e.g., tunable value change, cannot be implemented immediately, the kernel may hold the value change in the kernel registry 206 and apply it at a later time, e.g., a next reboot.

In one example Unix environment, the operating system kernel is a collection of around 350 kernel modules and has as many as 200 kernel tunables. This example environment is discussed herein for ease of illustration. However, the reader will appreciate that embodiments are not limited to a Unix operating system environment. In this Unix example, the kernel configuration parameters are managed by three commands known as kconfig, kcmodule, and kctune.

The kconfig command is used to manage whole kernel configurations. It allows configurations to be saved, loaded, copied, renamed, deleted, exported, imported, etc. It can also list existing saved configurations and give details about them.

The kcmodule command is used to manage kernel modules. Kernel modules can be device drivers, kernel subsystems, or other bodies of kernel code. Each module can have various module states including unused, static (compiled into the kernel and unable to be changed without rebuilding and rebooting), and/or dynamic (which can include both "loaded", i.e., the module is dynamically loaded into the kernel, and "auto", i.e., the module will be dynamically loaded into the kernel when it is first needed, but has not been yet). That is, each module can be unused, statically bound, e.g., bound into the main kernel executable, or dynamically loaded. These states may be identified as the states describing how the module will be used as of the next system boot and/or how the module is currently being used in the running kernel configuration. Kcmodule will display or change the state of any module in the currently running kernel configuration or a saved configuration.

Kctune is used to manage kernel tunable parameters. As mentioned above, tunable values are used for controlling allocation of system resources and tuning aspects of kernel performance. Kctune will display or change the value of any tunable parameter in the currently running configuration or a saved configuration.

As the reader will appreciate, kernel configuration consists of configuring and managing fairly distinct kernel domain entities. Some of these domain entities include those mentioned above, e.g., kernel tunables and kernel modules. In one Unix environment example, the list of domain entities that are currently managed by kernel configuration tools (described below) additionally includes "swap" devices (e.g., other memory media such as a floppy, hard disk, designated disk(s), etc. to move memory that is not presently being used), "dump" devices (e.g., a designated memory to receive a "crash dump", as the same is discussed below, when deleterious events occur with the operating system), and device bindings (e.g., which hardware (disks, etc.) to use with different aspects of the operating system). One example of a device binding is the assignment of a particular driver to a hardware device.

Figure 2B:
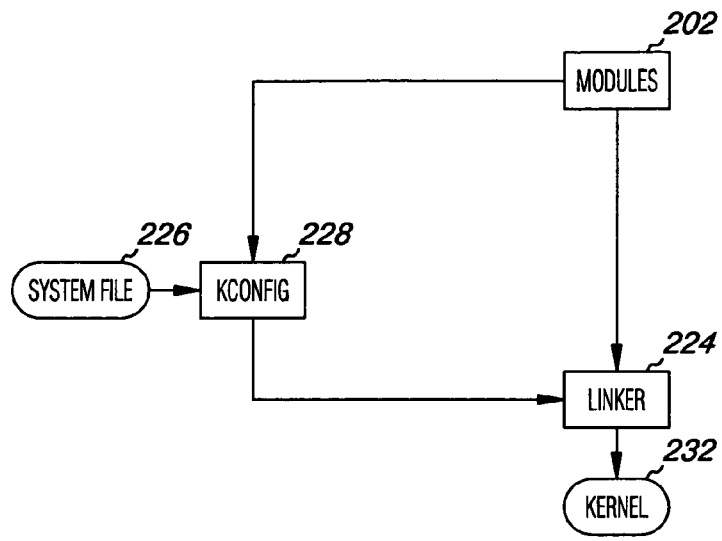
FIG. 2B is a block diagram of an embodiment of a kernel build system suitable to implement embodiments of the invention.

FIG. 2B is a block diagram of an embodiment of a build system suitable to implement embodiments of the invention. As shown in the example illustration of FIG. 2B, a system user, e.g., a system administrator, may be provided with access to a number of modules, shown generally as 202, and be able to load and unload modules (described below) from a kernel configuration 200 as part of installing, updating (upgrading), and/or managing an operating system kernel on a system based on user feedback received in response to a customer user interface feedback session. As the reader will appreciate, once a set of modules are created in a development environment for a kernel configuration 200 they are shipped from a supplier to a user or customer. As illustrated in FIG. 2B, the modules in a kernel (e.g., modules 202 in kernel configuration 200 of FIG. 2A) which are sold and shipped to a customer can be provided to a linker utility 224 that is used to join modules together to make a program, e.g., kernel configuration, for the particular customer's system. This part of the process may be performed in either the development environment or the runtime environment, i.e., on a customer system.

As illustrated in the embodiment of FIG. 2B, a system user may be provided with a kernel configuration tool, shown as kconfig 228, which executes program instructions to implement the embodiments described in further detail below. The kconfig 228 tool can read the modules, e.g., 202 in FIG. 2A, in the developer provided kernel 200 to find out what modules are available and set and select from among multiple saved kernel configurations. As illustrated in FIG. 2B the linker 224 can receive instructions from the kconfig 228 tool. The result of this process is a complete program, e.g., kernel file 232, that the customer can install on and use to run their system.

The kconfig tool 228 can allow a system administrator to specify various kernel configuration parameters, e.g., module states, tunable values, etc. The kconfig tool 228 can also be used to save and select from among multiple kernel configurations. An example of saving multiple kernel configurations can be found in copending application entitled, "Multiple Saved Kernel Configurations", application Ser. No. 10/440, 100, filed on May 19, 2003, assigned to the instant assignee, and incorporated herein by reference. Once satisfied with a kernel configuration, an administrator may desire to save a copy of the kernel configuration for a variety of reasons. For example, the administrator may want to have working backup configurations, protect the system against inadvertent configuration changes, be able to switch between different kernel configurations in different system usage environments, and/or provide copies of kernel configurations on multiple platforms. Such administrator chosen parameter values and kernel configurations can be contained in customer system files 226. Thus, the customer "system file" 226 can contain multiple saved kernel configurations and each saved kernel configuration can specify different kernel configuration parameters, e.g., module states, tunable values, etc., that the customer wants to use.

The function of linking modules can be accomplished at the time that the entire software program is initially compiled and can be performed at a later time either by recompiling the program "offline" or, in some instances, while the program is executing "online" in a runtime environment. As the reader will appreciate most operating system users are interested in high availability. That is, business networks can experience significant losses when a network operating system is down "offline" even for an hour. In many customer environments, it may be difficult to justify taking a system "offline" to rebuild and hence rebooting the system may be a viable alternative in order to effectuate kernel configuration changes.

The process of linking modules at runtime is also referred to as loading a module. The reverse process of unlinking a module at runtime is referred to as unloading a module. Runtime loading and unloading accommodates the user's desire for high availability. In many cases, when modules are loaded or unloaded the computing device or system has to be configured in a particular way in order for the module to load or unload correctly. For example, a module may have to seek access to another module to be properly loaded or unloaded. A module may also need access to other data to be used once the module is loaded. Additionally, a module may have to use program instructions to perform certain tasks in connection with the loading or unloading, e.g., may seek access to certain kernel parameters such as the aforementioned tunables, device bindings, swap and/or dump devices, etc. For example, a given tunable A may be defined as Tunable A=Tunable B+Tunable C. Thus, if either Tunable B or Tunable C changes then Tunable A has to change as well. If these operations are not accomplished correctly, such as before and/or after a module is loaded/unloaded, the loading and/or unloading of the module may not be achieved or worse yet the kernel may get into a bad error state, e.g., a panic state, from which it is unable to recover.

Figure 3:
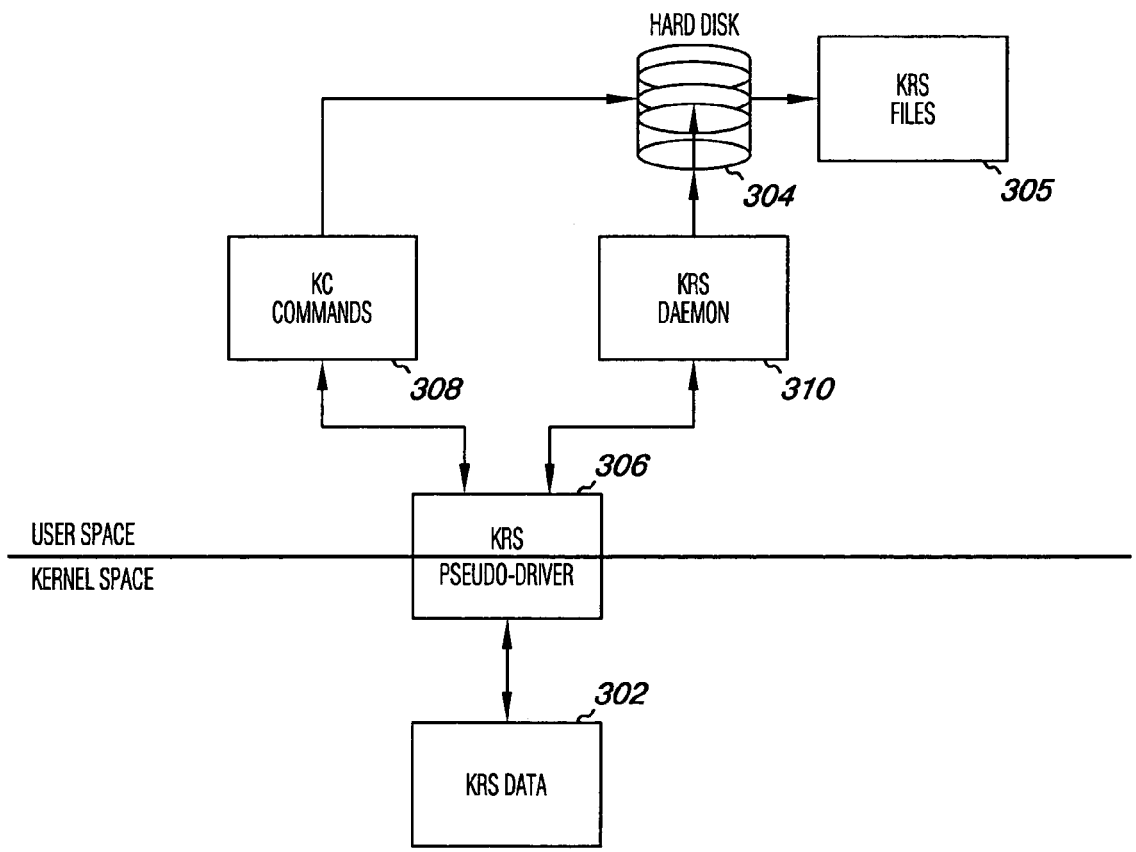
FIG. 3 is a block diagram of an embodiment of a kernel configuration system.

FIG. 3 is a block diagram of an embodiment of a kernel configuration system. FIG. 3 illustrates one example Unix environment for handling kernel configuration information. That is, the embodiment of FIG. 3 illustrates how kernel registry data is managed and how kernel configuration tools work with kernel registry data. The embodiment of FIG. 3 illustrates the delineation between kernel space and user space. In the embodiment of FIG. 3, the table of kernel registry data 302, in the Unix environment expressed as kernel registry service (KRS) data, is located in kernel space. The KRS data is read from a KRS file 305, or kernel registry file, which is located on a disk 304, e.g., hard disk, in user space.

According to various embodiments, once KRS data 302 is populated in the kernel space, user space program can access the data using a kernel registry pseudo driver, e.g., KRS pseudo driver 306, as described and discussed in more detail in co-pending application entitled, "Kernel Registry Write Operations", application Ser. No. 10/947,945, assigned to instant assignee, and incorporated herein by reference. Kernel configuration (KC) commands 308, such as those described above, handle KRS information both from the ICRS pseudo-driver 306 (which provides information from the kernel memory copy of KRS) and from the KRS files 305 on disk 304.

As illustrated in the embodiment of FIG. 3, a KRS daemon 310 is provided. As the reader will appreciate a daemon is a Unix program that executes in the background ready to perform an operation when required. Functioning like an extension to the operating system, a daemon is usually an unattended process that is initiated at startup. In the illustrative example, the KRS daemon 310 talks to the KRS pseudo driver and synchronizes the KRS data 302 in kernel space memory with the data on the disk 304 in the KRS file 305. In various embodiments, the KRS daemon 310 wakes up every 5 minutes to write data to disk 304. As one of ordinary skill in the art will appreciate, this action is referred to as "flushing" data to disk. According to various embodiments, the "flush" operation my also be forced as suited to various environments.

Figure 4:
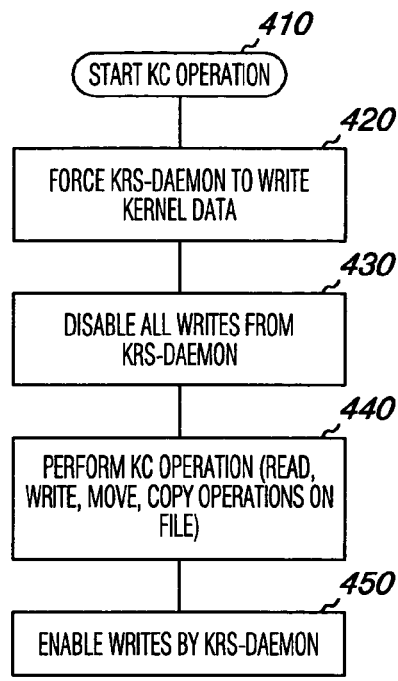
FIG. 4 is a flow chart illustrating an embodiment for enabling and disabling a kernel registry write operation in association with a kernel configuration change.

FIG. 4 is a flow chart illustrating an embodiment for enabling and disabling a kernel registry write operation in association with a kernel configuration change. As illustrated in the example embodiment of FIG. 4, a typical kernel configuration (KC) may involve doing several file operations to one or more KRS save files, shown in FIG. 3 as 305. As one of ordinary skill in the art will appreciate, kernel configuration operations include: read, write, move, and copy. In one embodiment, to ensure that the KRS daemon, shown as 306 in FIG. 3, and the KC tools, e.g. 228 in FIG. 2B, are not using the KRS save files on the disk, e.g., 305 and 304 in FIG. 3, respectively, a method according to FIG. 4 is utilized.

In the illustrative embodiment of FIG. 4, once a KC operation starts, as shown at block 410, the KRS daemon (306 in FIG. 3) is forced to perform a write operation to write the kernel registry information (KRS data 302 in FIG. 3) to disk (305 and 304 in FIG. 3), as shown at block 420. As shown in the embodiment of FIG. 4, program instructions execute such that KC commands (308 in FIG. 3) set a value to be seen by the daemon (310 in FIG. 3) in order to ensure that all writes to the KRS file (302 in FIG. 3) are disabled, as shown at block 430. As shown at block 440, the program instructions then execute to perform all KC changes to disk (304 in FIG. 3). This ensures that both processes, e.g., the KRS daemon (310 in FIG. 3) and the KC routine (as the same will be known and understood by one of ordinary skill in the art) are not using the KRS files (305 in FIG. 3) on the disk (304 in FIG. 3) at the same time. As one of ordinary skill in the art will appreciate, since the KRS daemon (310 in FIG. 3) is disabled, the program instruction can execute in association with the KC tools (e.g., 228 in FIG. 2B) to perform all the operations of the kernel configuration change (e.g., read, write, move, and copy, etc., as described above). As shown in the example embodiment of FIG. 4, once the KC tools (e.g., 228 in FIG. 2B) have completed their operations in block 440, program instructions execute to re-enable write operations from the KRS daemon (310 in FIG. 3), as shown at block 450.

More detail describing the embodiments of FIGS. 3 and 4 can be found in co-pending application entitled, "Kernel Registry Write Operations", application Ser. No. 10/947,945, assigned to the instant assignee, and incorporated herein by reference.

Figure 5:
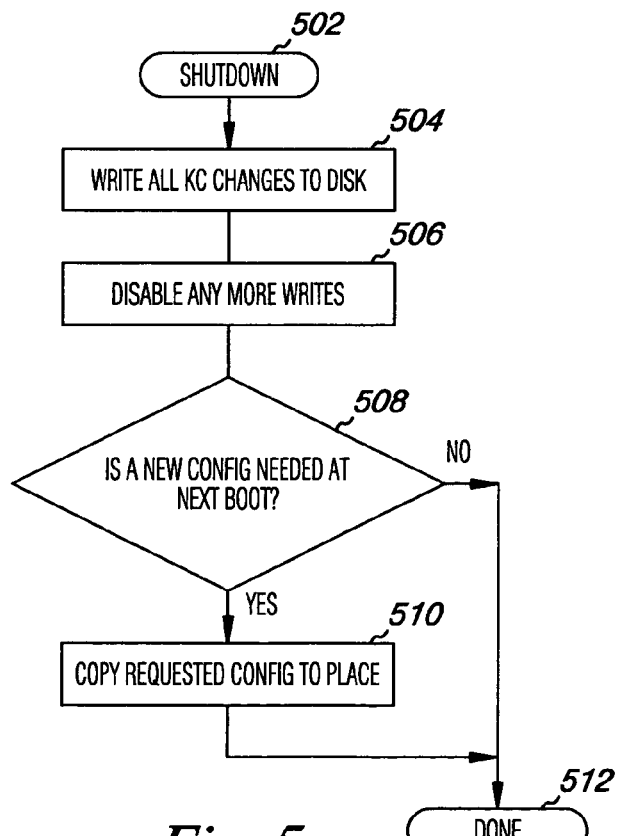
FIG. 5 is a flow chart illustrating an embodiment for an operating system shutdown routine in association with a kernel configuration change.
Figure 6:
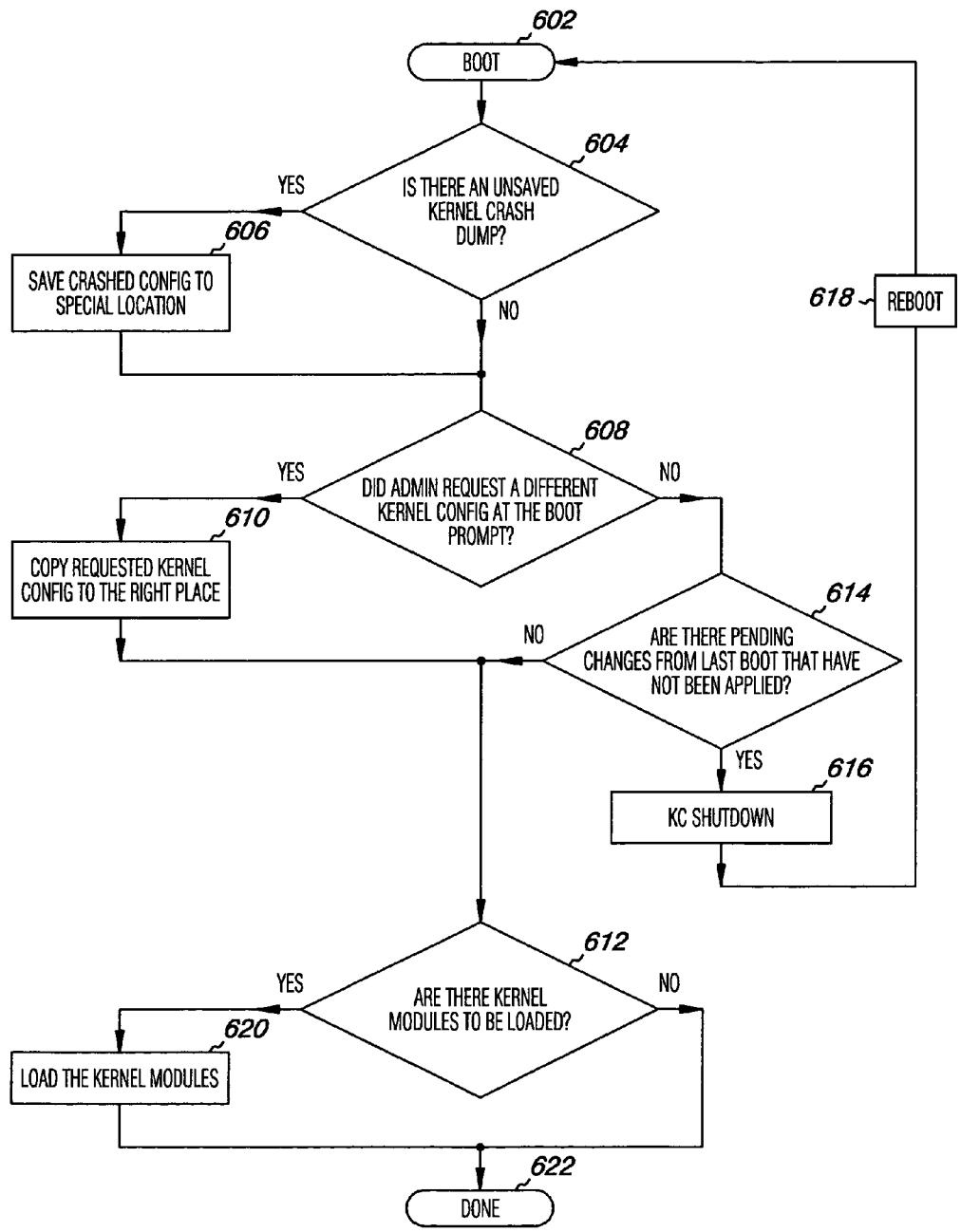
FIG. 6 is a flow chart illustrating an embodiment for an operating system boot routine in association with a kernel configuration change.

FIGS. 5 and 6 illustrate various embodiments for moving kernel configurations according to the present invention. As one of ordinary skill in the art will understand, the embodiments can be performed by one or more program/routines (e.g., computer executable instructions) operable on the devices shown herein or otherwise. The embodiments of the invention, however, are not limited to any particular operating environment or to executable instructions written in a particular programming language.

FIG. 5 illustrates a program embodiment for a shutdown routine. In the example Unix environment described above, the shutdown routine embodiment includes program instructions executable as a kernel configuration (KC) shutdown tool (e.g., kcshutdown tool). As the reader will appreciate, the kcshutdown routine, or tool, has access to processor and memory resources in kernel space and can be invoked by a kcshutdown command based on user feedback received in response to a system user interface feedback session.

FIG. 6 illustrates a program embodiment for a boot routine and system crash configuration. In the example Unix environment described above, the boot routine embodiment includes program instructions executable as a kernel configuration boot tool (e.g., kcboot tool). As the reader will appreciate, the kcboot routine, or tool, has access to processor and memory resources in kernel space and can be invoked by a kcboot command during the system boot process.

FIG. 5 is a flow chart illustrating an embodiment for an operating system shutdown routine in association with a kernel configuration change. As noted above, a shutdown routine can be called either via a shutdown command (e.g., as part of an orderly shutdown) or the reboot command (e.g., as part of a quick, forced shutdown). Previously, shutdown routines called through a shutdown command would move a selected or marked new kernel configuration into place during shutdown, but shutdown routines called through a reboot command would not. That is, the shutdown routine associated with the reboot command did not handle saved configurations, kernel registry service (KRS) databases, titles, etc. For reboot, the system user had to manually move the new desired kernel configuration into place prior to reboot.

As shown in the embodiment of FIG. 5, a shutdown routine is called at block 502, e.g., by the reboot command. As shown in FIG. 5, when a kcshutdown command is received, the program instructions execute to force a write operation of all kernel configuration information, e.g., kernel configuration changes, in a kernel registry memory (e.g., 302 in FIG. 3) to a disk (e.g., 304 in FIG. 3), as shown in block 504. The program embodiments include instructions which execute to disable new kernel registry memory writes (in association with the KC commands 308, the KRS pseudo-driver 306, and the KRS daemon 310) to the disk (e.g., 304 in FIG. 3) while performing kernel configuration operations (e.g., read, write, move, and copy, etc., as described herein) on the disk (304), as shown in block 506. The program instructions execute to wait until the KRS daemon has confirmed that the write has succeeded.

As shown in FIG. 5, program instructions then execute to check whether a new kernel configuration has been requested at next boot, as shown at block 508. In the example embodiment of FIG. 5, if a new kernel configuration has been requested, then the program instructions execute to automatically move the new kernel configuration, to be used at the next boot, to a boot location on disk. However, if no new kernel configuration has been requested, the program instructions execute to proceed with the shutdown routine sequence, e.g., this part of the shutdown routine according to program embodiments is now complete as shown in block 512.

When a new kernel configuration has been requested, the program instructions execute to move a particular kernel configuration to a documented or known location accessible by a boot routine as executed by a boot loader, as the same are known and understood by one of ordinary skill in the art. As shown at block 510 in the example embodiment of FIG. 5, the program instructions execute to copy the new (and/or selected/requested) kernel configuration and all files and links in a directory of the new kernel configuration to the document or known location. Once the new kernel configuration and all files and links in a directory of the new kernel configuration have been copied to the documented or known location, the program instructions execute to proceed with the shutdown routine sequence, e.g., this part of the shutdown routine according to program embodiments is now complete as shown in block 512.

In the example Unix environment, the program instructions execute to copy the new kernel and all files and links in a directory of the new kernel configuration (e.g. as can be saved in a user's system file 226 on disk 304) to a /stand/current directory. The program instructions also execute to create a link to the new kernel at /stand/vmunix to use upon a system startup.

As one of ordinary skill in the art will appreciate, in the example Unix environment the files and links to a /stand/current directory represent the kernel configuration that is presently in place or is booting on the computing system. Likewise, the link in to a /stand/vmunix is also intended to represent the kernel that is presently in place or is booting on the computing system. In this Unix example, both /stand/current/vmunix and /stand/vmunix represent one file on disk, e.g., point to the same place on disk.

The program instructions execute to perform the actions described above in association with receiving instructions to perform a shutdown routine. The shutdown routine can be called either via a shutdown command (e.g., as part of an orderly shutdown) and/or via a reboot command (e.g., as part of a quick, forced shutdown). For example, the Unix shutdown routine can be called via a kcshutdown command. Kcshutdown will then execute instructions to force a write operation (also referred to as a "flush") from the kernel registry in kernel space. The program instructions will then wait until all of the kernel registry data (also referred to in the Unix example as kernel registry service (KRS) memory) has been saved to the appropriate database file, as described in connection with FIGS. 3-5. The program instructions will then execute to automatically move a chosen or selected new kernel configuration to be used at next boot into place and recreate any appropriate links. According to the various program embodiments, the kcshutdown tool, e.g., computer executable instructions called by the kcshutdown command, will update the title, and modification time of the recently copied kernel configuration. Kcshutdown instructions execute to perform these actions moving only once per session. This is useful since shutdown will ultimately call reboot which otherwise would have caused the kcshutdown command to run twice.

Thus, in the example embodiment given above, if a saved configuration is marked to be used upon next boot, kcshutdown will copy the saved kernel configuration directory, and all of the other appropriate files and links, to the /stand/current directory. Additionally, the saved kernel configuration directory, and all of the other appropriate files and links, will be copied as the new vmunix file to /stand/vmunix for a boot loader to use upon system start up.

Many boot tools and methods rely on the existence of a well-known file path that points to a kernel configuration that has been booted. Administrators previously had to manually ensure that this file path was indeed the kernel that has been booted or otherwise account for the possibility that certain operating system tools and methods would not work properly if a kernel configuration other than the one at the well-known path was booted. One example of a tool that would misbehave if a kernel configuration other than the one at the well-defined path was booted is a save crash utility.

FIG. 6 is a flow chart illustrating an embodiment for an operating system boot routine in association with a kernel configuration change. That is, a program embodiment is provided which executes instructions, at a system startup (e.g., boot 602), to check whether an unsaved crash dump from a previous system error exists, as shown at decision block 604. If one exists, the program instructions execute to copy the kernel configuration which caused the system error to a designated file location, as shown in block 606. In the Unix example, the program instructions execute to copy the kernel configuration (which caused the system error) from a /stand/current directory to a stand/crashconfig directory.

As described above, crash utility tools are unable to deterministically say which kernel configuration caused the panic. Crash utility tools typically copy a kernel configuration located at a pre-defined directory along with a crash dump. This activity of copying a kernel configuration in place at the time of system panic is referred to as a "crash dump". In the Unix example, the crash utility tools previously copied a kernel located at /stand/vmunix along with the crash dump. In some scenarios, a system user may have interacted with a boot prompt to boot to a kernel configuration different from the one which is present at the pre-defined location (i.e., /stand/vmunix).

As will be described in more detail below, the kernel which is booted as a result of a system administrator's interaction with the boot prompt is saved to the directory /stand/current. Previously, if a crash dump occurred while using another boot prompted kernel configuration, the system user would have to remember to manually copy this requested kernel configuration for diagnostic use since a different kernel configuration would exist in the pre-defined location (i.e., /stand/vmunix) and would have been copied by default. If the wrong kernel configuration is copied along with the crash dump, the results will be unreadable since a kernel id contained in the crash dump will not match the kernel configuration copied from the pre-determined directory.

The program instructions described herein execute to eliminate this possible scenario. That is, when the system boots the next time, utility tools which know if a crash dump occurred and will execute instructions to save the kernel state information to a known file location, e.g., what programs were running and what their state was at the time of the crash. While saving the state data to a known location, the utility tools will also execute instructions to save a copy of the kernel configuration which caused the crash to a known file location, e.g., from a /stand/current directory to a stand/crashconfig directory.

Thus, program instructions execute, in association with the kernel configuration tools (e.g., 228 in FIG. 2B) to query the crash utility tools (also referred to as crash dump tools) at boot to find out if there was a kernel panic in a previous boot which has not yet been saved. If the answer is yes, then a copy of the kernel configuration which is under /stand/current is copied to the location /stand/crashcon FIG. After this, the kernel configuration under /stand/vmunix and the kernel configuration under /stand/current are overwritten with the kernel configuration that is currently booted. For example, if a kernel configuration "A" was booting and got into a panic static and crash dumped, a system administrator would likely attempt to bring the system back up using a different kernel configuration "B". In this example, as the system attempts to reboot using kernel configuration "B" the program instructions execute copy kernel configuration "A" to /stand/crashconfig and overwrite /stand/vmunix and /stand/current with kernel configuration "B". The crash dump tools will then be able to consistently access the kernel configuration which caused the panic at the last boot, e.g., "A", and copy that kernel configuration along with the crash dump information to be investigated.

As illustrated in FIG. 6, a program embodiment is also provided which executes instructions, at a system startup (e.g., boot 602), to check whether a different kernel configuration is requested at a boot prompt, as shown at decision block 608. As shown at block 610, if a different kernel configuration is requested, the program instructions execute to automatically boot the different kernel configuration and execute to identify the different kernel configuration as the booted kernel configuration. In the Unix example, the program embodiments execute to copy the new kernel and all files and links in a directory of the new kernel configuration (e.g. as can be saved in a user's system file 226 on disk 304) to a /stand/current directory. The program instructions also execute to copy the new kernel configuration and all files in the directory of the new kernel configuration to a /stand/current directory to use upon a system startup. Thus, program instructions execute to automatically check and point the well-known kernel path to whatever kernel is actually booted.

As illustrated in FIG. 6, a program embodiment is also provided which executes instructions, at a system startup (e.g., boot 602), to check whether there are pending kernel configuration changes since last boot that have not been applied, as shown in decision block 614. As illustrated in FIG. 6, decision block 614 is not reached if the system administrator requested a different kernel configuration at the boot prompt in decision block 608. As shown in the illustrative example of FIG. 6, when there are pending kernel configuration changes, the program instructions execute to force a system shutdown routine and reboot (as shown at blocks 616 and 618, respectively) as has been described in connection with FIG. 5. According to one embodiment, a system administrator is given a timed window, e.g., a 10-second window, in which to block this automatic reboot, should it be undesirable for some reason.

Thus, program instructions execute to provide a mechanism to check at boot time whether the kernel configuration that is booted is the one that was requested (e.g., selected from among multiple saved kernel configurations by a system user) to be used during this boot. For example, if the system is booting after a previous crash or power failure, it is quite possible that the kernel configuration that was set to be used at next boot is not yet moved into place because the shutdown program was never run. The program instructions execute a boot routine which detects this situation during boot and automatically moves the desired kernel configuration into place. The program instructions then execute to issue a reboot so that the system can boot the user intended, i.e., requested, kernel configuration. In the example Unix environment described above, the boot routine embodiment includes program instructions executable as a kernel configuration boot tool (e.g., kcboot tool). In the Unix example, kcboot detects when the system is booting after a previous crash and executes instructions to automatically move a requested kernel configuration (previously not yet moved into place) into place. As noted above, the kcboot routine, or tool, has access to processor and memory resources in kernel space and can be invoked by a kcboot command.

As illustrated in FIG. 6, a program embodiment is also provided which executes instructions in connection with a boot routine, e.g., kcboot, to check whether there are dynamic kernel modules to be loaded (along with any module related scripts to make the module usable) in association with a kernel configuration that is booted, as shown at decision block 612. An example of this is described and discussed in more detail in co-pending application entitled, "Module Preparation Scripts", application Ser. No. 10/931,720, filed on Sep. 1, 2004, assigned to the instant assignee, and incorporated herein by reference. As the reader will appreciate, a boot routine includes dispatch points which control what happens, and at what time, in a boot routine process. At different dispatch points different instructions execute including initialization of various subsystems and loading of kernel modules associated with a dispatch point. Thus, when a system is "powered on" instructions associated with various dispatch points are executed and eventually control of the system is transferred over to system users. Program embodiments described herein include instructions which execute prior to the system user being transferred control to check whether there are dynamic modules to be loaded (e.g., dynamically loadable kernel modules) as selected by a system user (e.g., system administrator).

In the Unix example, kcboot executes instructions in connection with the kconfig tools (228 in FIG. 2) to check whether there are dynamic modules to be loaded. As illustrated in FIG. 6, if there are no dynamic modules to be loaded then the program instruction execute to proceed with the boot routine sequence, e.g., this part of the boot routine according to the program embodiments is now complete, as shown in block 622. However, if kcboot detects that there are dynamic kernel modules to be loaded, then the program instructions execute to load the dynamic kernel modules, as shown in block 620. Thus, the program embodiments include instructions which execute to ensure the system boots the requested kernel configuration along with all intended dynamic kernel modules.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer readable storage medium encoded with a program that is executed by a computer to cause a device to perform a method, comprising:

checking, at a system shutdown, whether a new kernel configuration has been requested at a next boot;

forcing a write operation of all kernel configuration information in a kernel registry service memory to a disk, including waiting for the write operation to complete and then disabling new kernel registry service memory writes to the disk while performing kernel configuration operations on the disk; and automatically moving the new kernel configuration to be used at the next boot from the disk to a boot location.

2. The medium of claim 1, further including automatically linking pointers identifying the new kernel configuration to be used at the next boot.

3. The medium of claim 1, further including, at the system shutdown:

copying the new kernel configuration and all files and links in a directory of the new kernel configuration to a /stand/current directory; and creating a link to the kernel from /stand/vmunix to use upon a system startup.

4. The medium of claim 1, wherein the method is performed upon execution of a system reboot command and a system shutdown command.

5. The medium of claim 1, wherein forcing a write operation of all kernel configuration information in a kernel registry service memory to the disk includes updating titles and modification times for saved and copied kernel configurations.

6. The medium of claim 1, wherein the disk includes one or more kernel registry files.

7. A computer readable storage medium encoded with a program that is executed by a computer to cause a device to perform a method, comprising:

at a system startup, checking whether a different kernel configuration is requested at a boot prompt, including checking whether a saved kernel configuration is flagged for a next boot; and if requested, automatically booting the different kernel configuration and identifying the different kernel configuration as the booted kernel configuration.

8. The medium of claim 7, further including automatically linking pointers identifying the booted kernel configuration.

9. The medium of claim 7, further including;

copying a requested kernel configuration and all files and links in a directory of the requested kernel configuration to a /stand/current directory; and creating a link to the requested kernel from /stand/vmunix.

10. The medium of claim 7, further including checking whether there are dynamic kernel modules to be loaded and, if so, loading the dynamic kernel modules during boot.

11. The medium of claim 7, further including checking whether there are pending kernel configuration changes since last boot that have not been applied.

12. The medium of claim 11, further including forcing a reboot of the system and applying pending kernel configuration changes.

13. The medium of claim 12, wherein applying kernel configuration changes includes updating titles and modification times for saved and copied kernel configurations.

14. The medium of claim 7, further including checking whether an unsaved kernel crash dump exists.

15. The medium of claim 14, further including copying a kernel configuration associated with the unsaved kernel crash dump to a designated file location.

16. The medium of claim 15, wherein the designated file location is a /stand/crashconfig directory.

17. A computer readable storage medium encoded with a program that is executed by a computer to cause a device to perform a method, comprising:
- at a system startup, checking whether a different kernel configuration is requested for boot;
- checking whether there are pending kernel configuration changes since last boot that have not been applied, when there are pending kernel configuration changes the method further including:
  - forcing a write of all kernel configuration information in a kernel registry service memory to a location on a disk;
  - disabling new kernel registry service memory writes to the disk while performing kernel configuration operations on the disk; and
  - automatically copying the requested kernel configuration with updated kernel configuration changes from the location on disk to a boot file directory;
- automatically booting the requested kernel configuration; and
- automatically identifying the requested kernel configuration as the booted kernel configuration.

18. The medium of claim 17, wherein automatically copying the requested kernel configuration to the boot file directory includes creating a link to the requested kernel configuration from /stand/vmunix.

19. The medium of claim 17, wherein identifying the requested kernel configuration as the booted kernel configuration includes copying the requested kernel configuration to a /stand/current directory.

20. The medium of claim 17, further including checking whether there are dynamic kernel modules to be loaded and, if so, loading the dynamic kernel modules during boot.

21. A computer readable storage medium encoded with a program that is executed by a computer to cause a device to perform a method, comprising:
- at a system startup, checking whether an unsaved kernel crash dump exists, and if so copying a kernel configuration associated with the unsaved kernel crash dump to a designated file location;
- checking whether a different kernel configuration is requested for boot; and
- if requested, automatically booting the different kernel configuration and automatically identifying the different kernel configuration as the booted kernel configuration.

22. The medium of claim 21, wherein copying the kernel configuration associated with the unsaved kernel crash dump to a designated file location includes copying a kernel configuration from a /stand/current directory to a /stand/crashconfig directory.

23. The medium of claim 22, wherein automatically booting the different kernel configuration includes creating a link to the different kernel configuration from /stand/vmunix.

24. The medium of claim 23, wherein identifying the different kernel configuration as the booted kernel configuration includes copying the different kernel configuration to the /stand/current directory.

25. The medium of claim 21, further including checking whether there are pending kernel configuration changes since last boot that have not been applied, and when there are pending kernel configuration changes the method further including:
- forcing a write of all kernel configuration information in a kernel registry service memory to a disk;
- disabling new kernel registry service memory writes to the disk while performing kernel configuration operations on the disk; and
- automatically copying the different kernel configuration with updated kernel configuration changes from the disk to a boot file directory.

26. A computer readable storage medium encoded with a program that is executed by a computer to cause a device to perform a method, comprising:
- at a system startup, checking whether an unsaved kernel crash dump exists, and if so copying the unsaved kernel crash dump to a designated file location;
- checking whether a different kernel configuration is requested for boot;
- checking whether there are pending kernel configuration changes since last boot that have not been applied, when there are pending kernel configuration changes the method further including:
  - forcing a write of all kernel configuration information in a kernel registry service memory to a location on a disk;
  - disabling new kernel registry service memory writes to the disk while performing kernel configuration operations on the disk; and
  - automatically copying the requested kernel configuration with updated kernel configuration changes from the disk to a boot file directory; and
- automatically booting the requested kernel configuration and automatically identifying the different kernel configuration as the booted kernel configuration.

27. A kernel configuration tool, comprising:
- a processor;
- a memory coupled to the processor; and
- program instructions provided to the memory and executable by the processor to:
  - check, at a system shutdown, whether a new kernel configuration has been requested at a next boot and whether a saved kernel configuration is flagged for a next boot; and
  - automatically moving the new kernel configuration to be used at the next boat to a boot location.

28. The tool of claim 27, wherein the program instructions can execute to:
- force a write operation of all kernel configuration information in a kernel registry service memory to a disk; and
- disable new kernel registry service memory writes to the disk while performing kernel configuration operations on the disk.

29. The tool of claim 28, wherein the kernel configuration operations include executing program instructions to update titles and modification times for saved and copied kernel configurations.

30. The tool of claim 28, wherein the program instructions execute to force the write operation of all kernel configuration information in the kernel registry service memory to one or more kernel registry files on the disk.

31. The tool of claim 27, wherein the program instructions can execute to automatically link pointers identifying the new kernel configuration to be used at the next boot.

32. The tool of claim 27, wherein the program instructions can execute to:
- copy the new kernel configuration and all files and links in a directory of the new kernel configuration to a /stand/current directory; and
- create a link to the new kernel configuration from /stand/vmunix to use upon a system startup.

33. The tool of claim 27, wherein the program instructions are executed upon receiving a system reboot command and a system shutdown command.

34. A kernel configuration tool, comprising:
a processor;
a memory coupled to the processor; and
program instructions provided to the memory and executable by the processor to:
 at a system startup, check whether a different kernel configuration is requested for boot;
 check whether there are pending kernel configuration changes since last boot that have not been applied; and when there are pending kernel configuration changes the program instructions execute to:
  force a write operation of all kernel configuration information in a kernel registry service memory to a disk;
  disable new kernel registry service memory writes to the disk while performing kernel configuration operations on the disk; and
  automatically copy the different kernel configuration with updated kernel configuration changes from the disk to a boot file directory;
 automatically boot the different kernel configuration; and
 automatically identifying the booted kernel configuration.

35. The tool of claim 34, wherein the program instructions can execute to automatically create a link to a different kernel from /stand/vmunix.

36. The tool of claim 34, wherein the program instructions can execute to copy the booted kernel configuration to a /stand/current directory.

37. The tool of claim 34, wherein the program instructions can execute to check whether there are dynamic kernel modules to be loaded and, if so, can execute to load the dynamic kernel modules during boot.

38. A kernel configuration tool, comprising:
a processor;
a memory coupled to the processor; and
program instructions provided to the memory and executable by the processor to:
 at a system startup, check whether an unsaved crash dump from a system error exists, and if so can execute to copy an associated kernel configuration which caused the system error to a designated file location;
 check whether a different kernel configuration is requested for boot; and
 if requested, automatically boot the different kernel configuration and automatically identify the different kernel configuration as the booted kernel configuration.

39. The tool of claim 38, wherein the program instructions can execute, in connection with copying the associated kernel configuration which caused the system error, to copy a kernel configuration from a /stand/current directory to a stand/crash-config directory.

40. The tool of claim 38, wherein the program instructions can execute to automatically create a link a different kernel from /stand/vmunix.

41. The tool of claim 38, wherein the program instructions can execute to automatically copy the different kernel configuration to a /stand/current directory.

42. The tool of claim 38, wherein the program instructions can execute to check whether there are pending kernel configuration changes since last boot that have not been applied, and when, there are pending kernel configuration changes the program instructions can execute to:
 force a write operation of all kernel configuration information in a kernel registry service memory to a disk;
 disable new kernel registry service memory writes to the disk while performing kernel configuration operations on the disk; and
 automatically copy the different kernel configuration with updated kernel configuration changes from the disk to a boot file directory.

43. A kernel configuration system, comprising:
a kernel configuration tool;
a system file accessible by the kernel configuration tool; and
a computer readable storage medium encoded with a program that is executed by a computer to cause the kernel configuration to check whether a different kernel configuration is requested at a boot prompt including whether a saved kernel configuration is flagged for a next boot.

* * * * *

UNITED STATES PATENT AND TRADEMARK OFFICE
CERTIFICATE OF CORRECTION

PATENT NO. : 7,392,374 B2  Page 1 of 1
APPLICATION NO. : 10/946200
DATED : June 24, 2008
INVENTOR(S) : Aswin Chandramouleeswaran et al.

It is certified that error appears in the above-identified patent and that said Letters Patent is hereby corrected as shown below:

In column 8, line 1, delete "ICRS" and insert -- KRS --, therefor.

In column 11, line 59, delete "crashcon FIG" and insert -- crashconfig --, therefor.

In column 14, line 44, in Claim 9, after "including" delete ";" and insert -- : --, therefor.

In column 16, line 39, in Claim 27, delete "boat" and insert -- boot --, therefor.

In column 17, line 9, in Claim 34, delete "applied;" and insert -- applied, --, therefor.

In column 17, line 23, in Claim 34, delete "identifying" and insert -- identify --, therefor.

In column 18, line 13, in Claim 40, after "link" insert -- to --.

In column 18, line 21, in Claim 42, after "when" delete ",".

Signed and Sealed this

Seventh Day of October, 2008

JON W. DUDAS
*Director of the United States Patent and Trademark Office*